United States Patent
Pinto et al.

(10) Patent No.: US 12,492,284 B2
(45) Date of Patent: Dec. 9, 2025

(54) EPOXY-SILOXANE COPOLYMER COMPOSITIONS AND METHODS OF MAKING AND USING THE SAME

(71) Applicant: Clarapath, Inc., Hawthorne, NY (US)

(72) Inventors: Jerry Pinto, New York, NY (US); Charles Cantor, New York, NY (US)

(73) Assignee: Clarapath, Inc., Hawthorne, NY (US)

( * ) Notice: Subject to any disclaimer, the term of this patent is extended or adjusted under 35 U.S.C. 154(b) by 515 days.

(21) Appl. No.: 17/948,886

(22) Filed: Sep. 20, 2022

(65) Prior Publication Data

US 2023/0085868 A1    Mar. 23, 2023

Related U.S. Application Data

(60) Provisional application No. 63/246,091, filed on Sep. 20, 2021.

(51) Int. Cl.
| | |
|---|---|
| C08G 59/24 | (2006.01) |
| C08F 114/26 | (2006.01) |
| C08G 59/50 | (2006.01) |
| C08G 77/00 | (2006.01) |
| C08G 77/42 | (2006.01) |
| C08K 3/04 | (2006.01) |
| C08K 3/08 | (2006.01) |
| C08K 5/544 | (2006.01) |
| C09D 5/02 | (2006.01) |
| G01N 1/06 | (2006.01) |

(52) U.S. Cl.
CPC .......... *C08G 59/245* (2013.01); *C08F 114/26* (2013.01); *C08G 59/50* (2013.01); *C08G 77/42* (2013.01); *C08G 77/80* (2013.01); *C08K 3/04* (2013.01); *C08K 3/08* (2013.01); *C08K 5/544* (2013.01); *C09D 5/025* (2013.01); *G01N 1/06* (2013.01); *C08K 2003/0806* (2013.01)

(58) Field of Classification Search
None
See application file for complete search history.

(56) References Cited

U.S. PATENT DOCUMENTS

| | | | |
|---|---|---|---|
| 5,804,616 A | | 9/1998 | Mowrer et al. |
| 6,528,585 B1 * | | 3/2003 | Standke ................ C08F 255/02 526/279 |

(Continued)

FOREIGN PATENT DOCUMENTS

| | | | |
|---|---|---|---|
| CN | 104530536 A | | 4/2015 |
| CN | 109135502 A | * | 1/2019 ........... C09D 163/00 |
| WO | 2023044504 A1 | | 3/2023 |

OTHER PUBLICATIONS

Automatic Microtomes—Avantor (Year: 2019).*

(Continued)

*Primary Examiner* — Randy P Gulakowski
*Assistant Examiner* — Holley Grace Hester
(74) *Attorney, Agent, or Firm* — Greenberg Traurig, LLP; Roman Fayerberg; Richard Brooks

(57) ABSTRACT

A composition of the present disclosure includes an aqueous dispersion of epoxy resin particles. The epoxy resin particles include at least two 1,2-epoxide groups. The composition further includes one or more anti-adhesive agents, one or more anti-microbial agents, or a combination of one or more anti-adhesive agents and one or more anti-microbial agents.

31 Claims, 8 Drawing Sheets

Representative Structures Embodied in Epoxy-Siloxane Polymers

(56) References Cited

U.S. PATENT DOCUMENTS

2007/0009657 A1* 1/2007 Zhang .................... C09D 7/62
428/206
2015/0247015 A1 9/2015 Chen
2016/0369074 A1 12/2016 Hadley et al.

OTHER PUBLICATIONS

Plastic embedding for light microscopy (Year: 2017).*
English Machine Translation of Text and Figures of CN109135502A (Year: 2019).*
Progress in Organic Coatings 172 (2022) 107100 (Year: 2022).*
International Search Report; PCT/US2022/076729; Date: Jan. 5, 2023; By: Authorized Officer: Shane Thomas.

* cited by examiner

Figures 1A-1D
Representative Structures Embodied in Epoxy-Siloxane Polymers
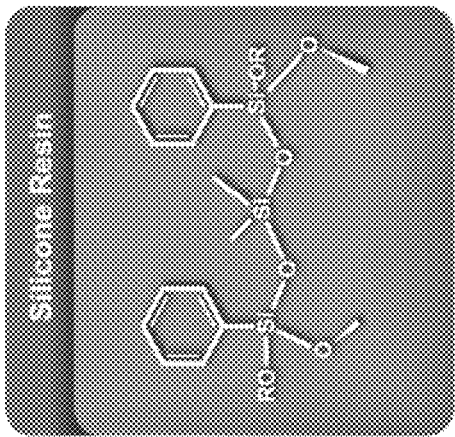
FIG. 1A
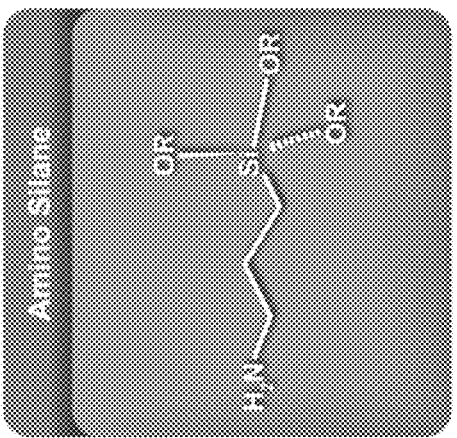
FIG. 1B
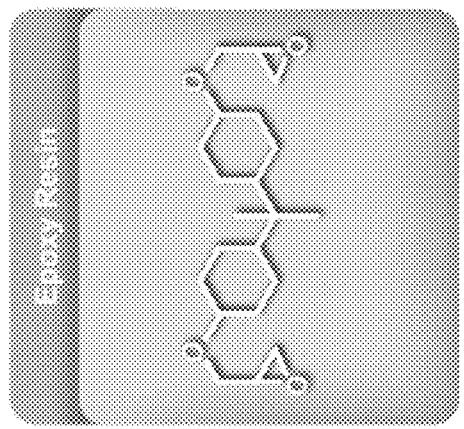
FIG. 1C
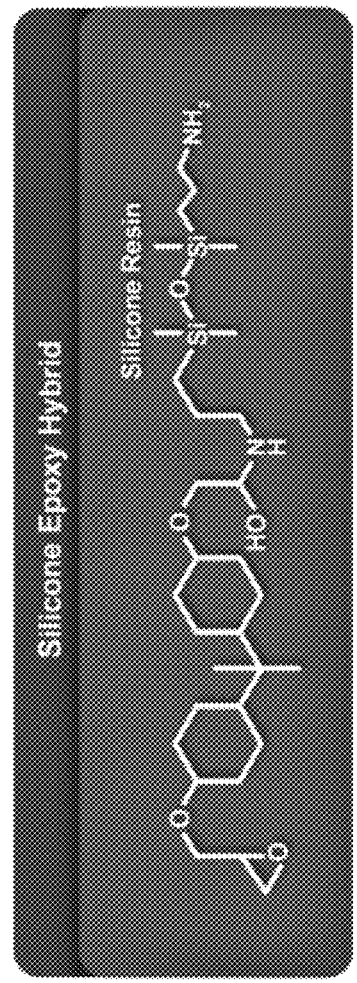
FIG. 1D

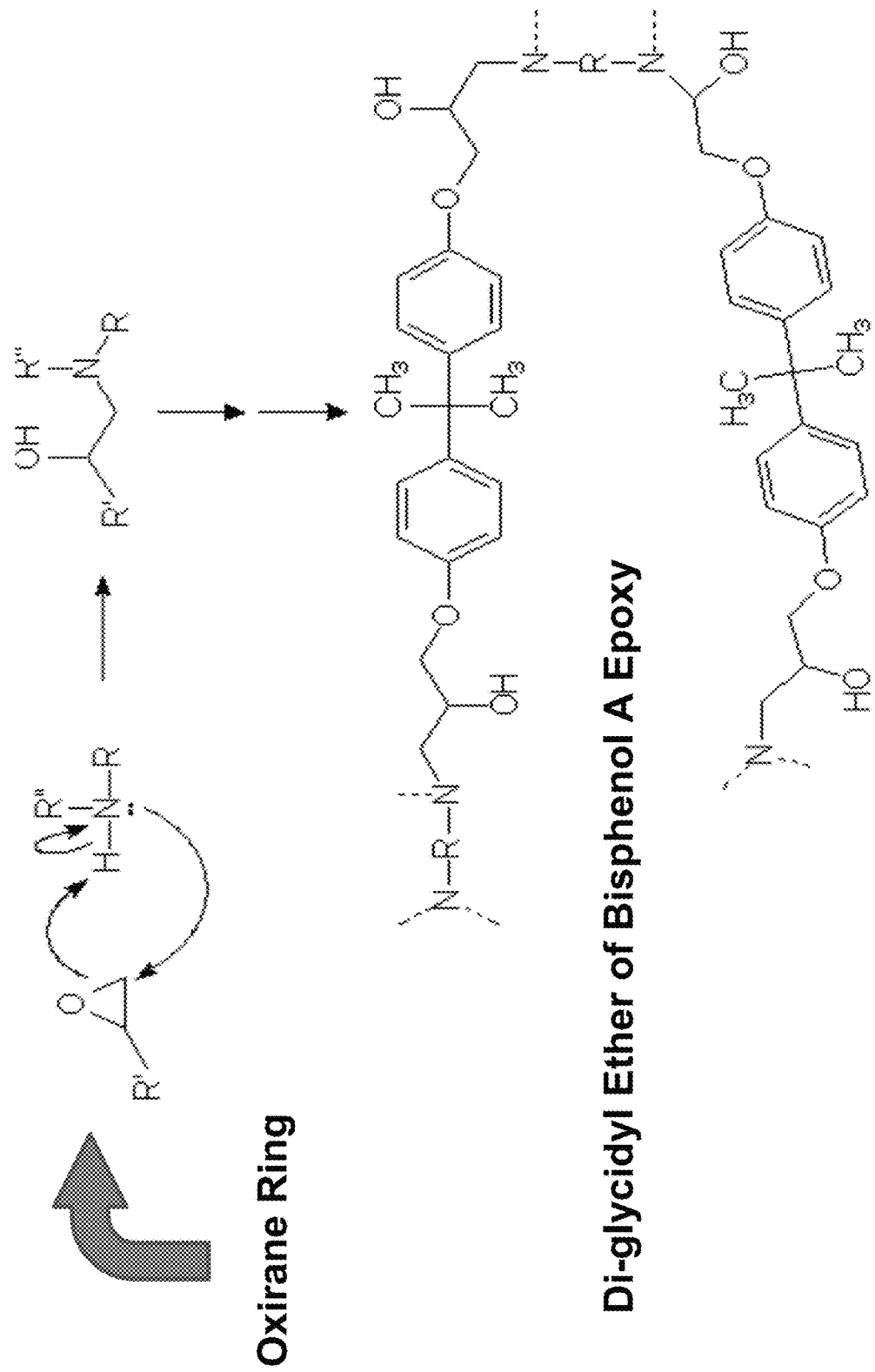
Figure 2 Epoxy Amine Prototypical Reaction Mechanism
Oxirane Ring
Di-glycidyl Ether of Bisphenol A Epoxy

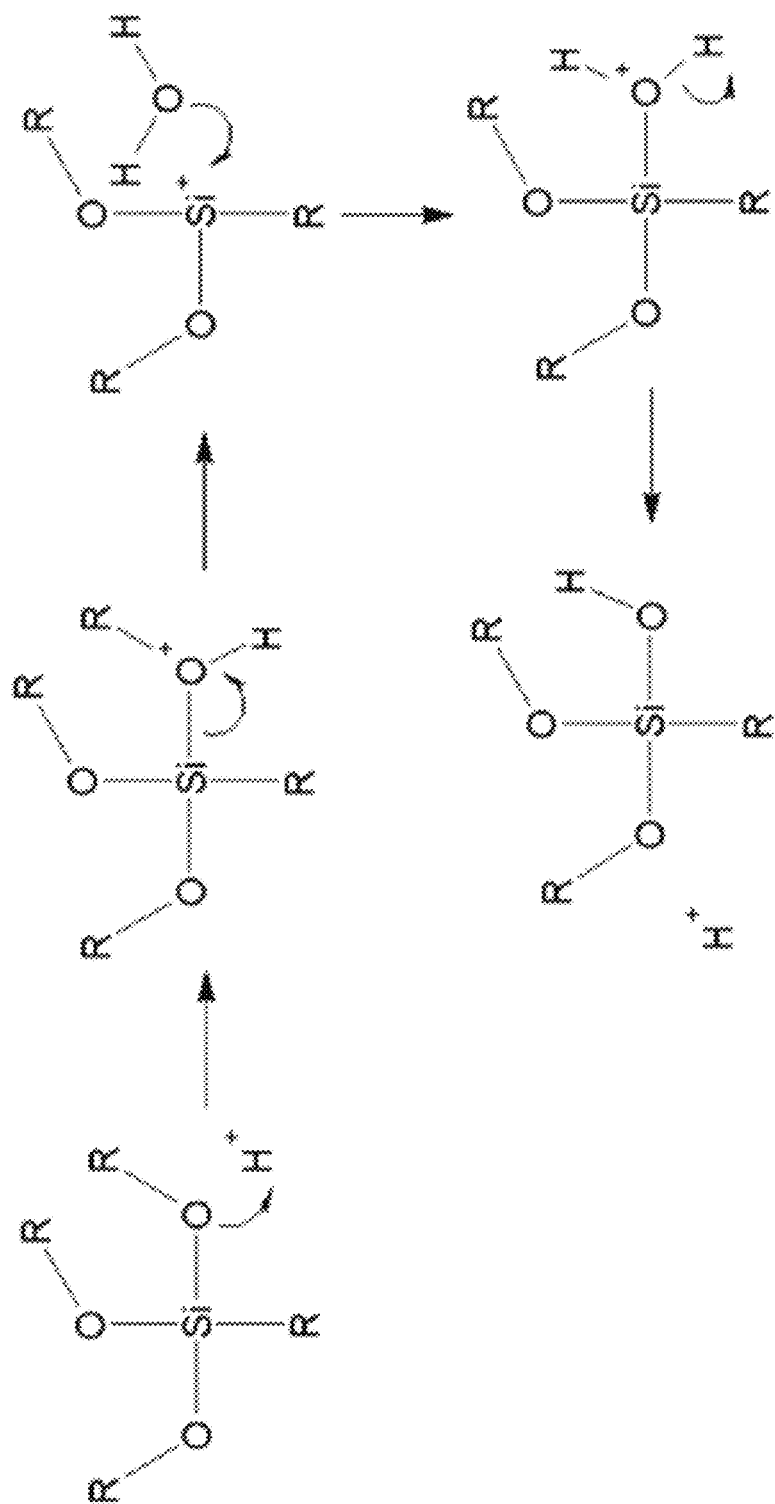
Figure 3 Hydrolysis of Alkoxy Siloxane Group Generating a Silanol

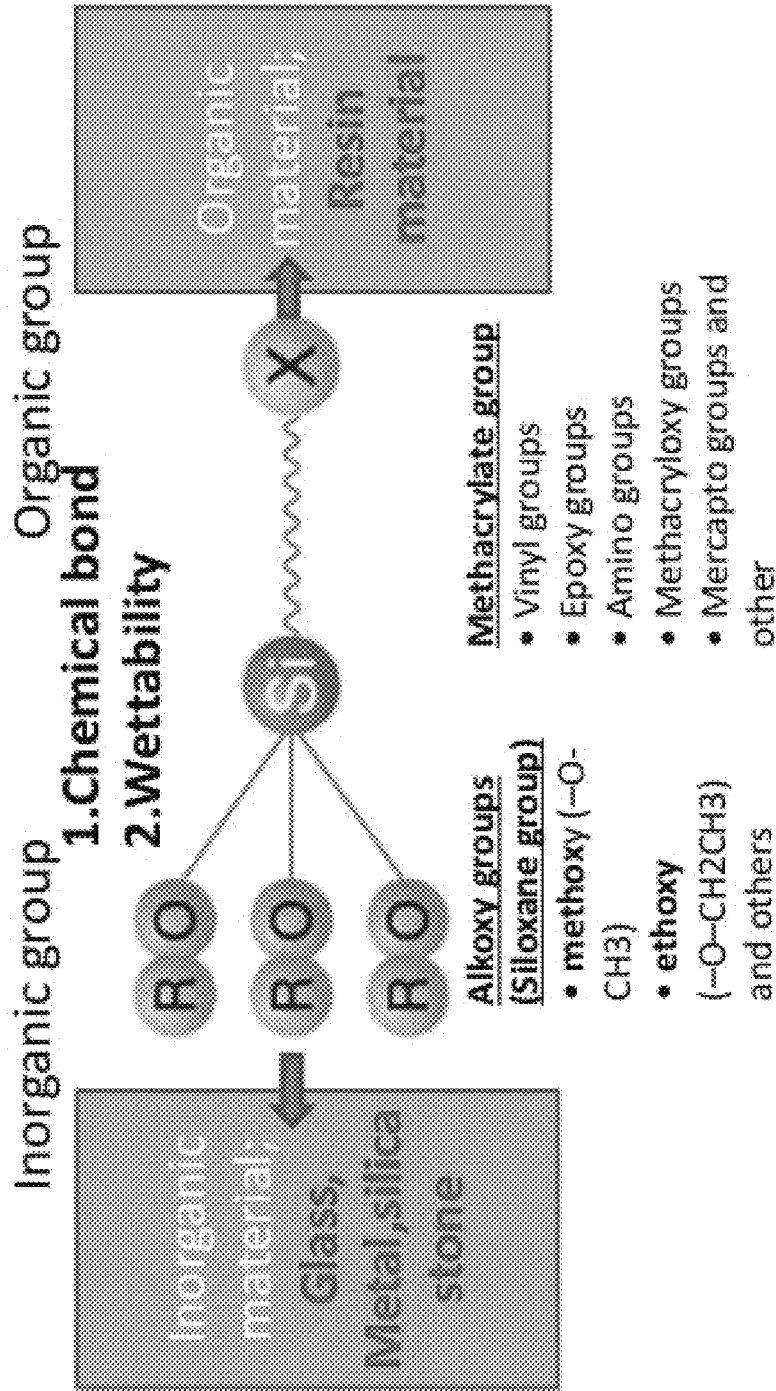
Figure 4 General Reaction Paradigm of Silane Coupling Agents

Figure 5 Hydrolysis and Condensation Chemistry Generating Siloxanes
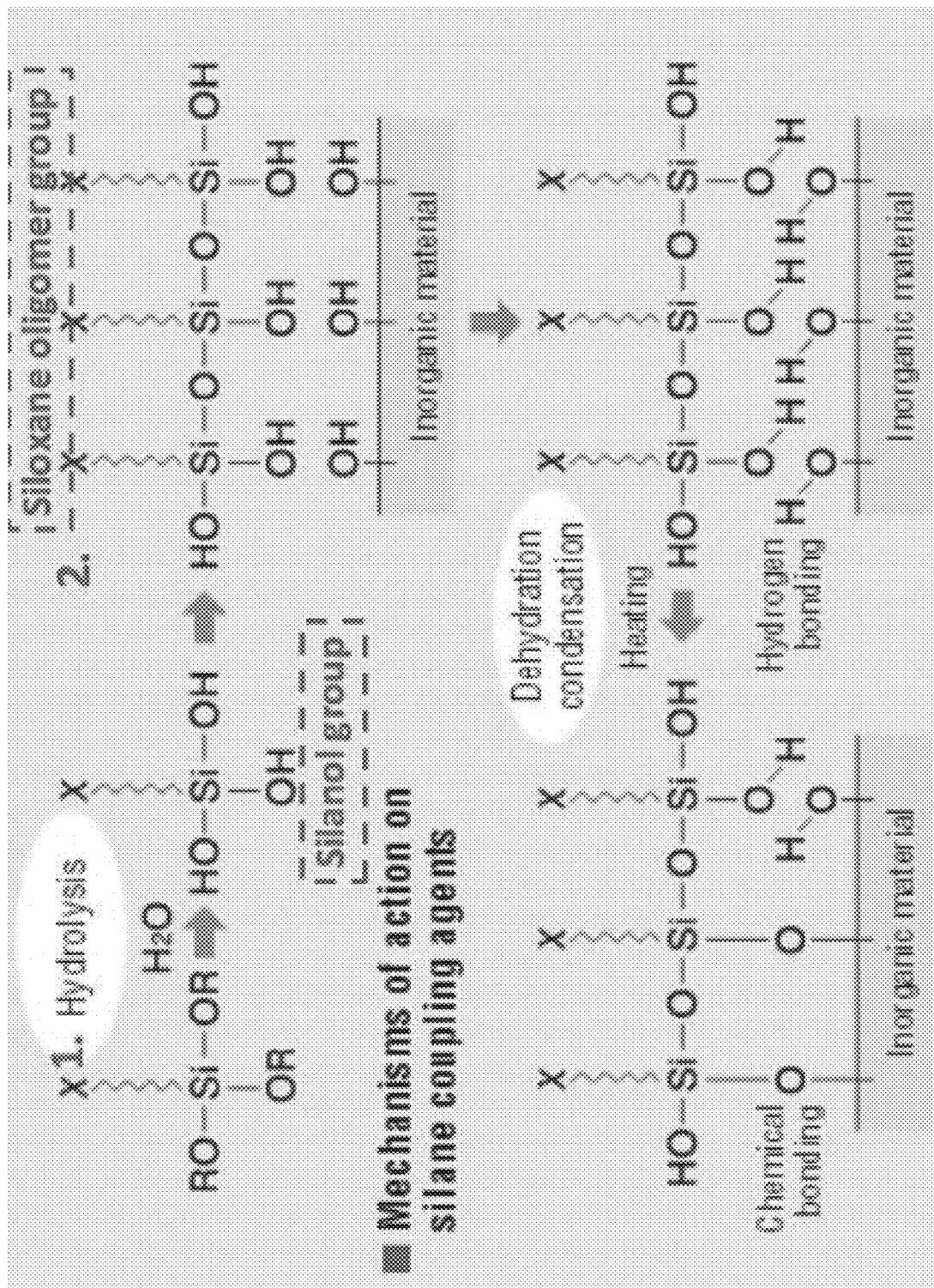

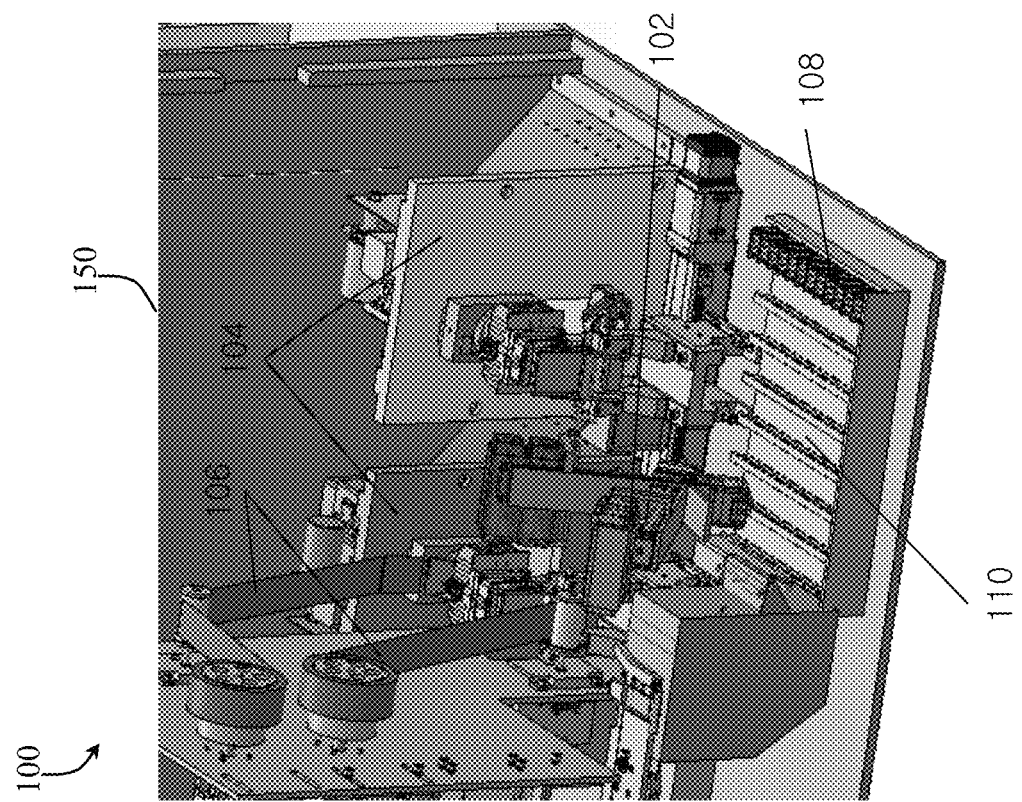

EPOXY-SILOXANE COPOLYMER COMPOSITIONS AND METHODS OF MAKING AND USING THE SAME

CROSS-REFERENCE TO RELATED APPLICATION

This application claims the benefit of and priority to U.S. Provisional Patent Application No. 63/246,091 filed Sep. 20, 2021, and the contents of this application is incorporated herein by reference in its entirety.

FIELD

The present disclosure relates to anti-adhesive compositions, substrates coated with such anti-adhesive compositions and methods of using the same. In some embodiments, the compositions also include one or more anti-bacterial components.

BACKGROUND

Traditional microtomy, the production of micron-thin tissue sections for microscope viewing, is a delicate, time consuming manual task. To create a large number of sample sections quickly, it is desirable to automate the process of cutting tissue sections from the supporting tissue block by a microtome blade and facilitating the transfer of cut tissue sections to slides. It may be advantageous to use anti-adhesive coatings and/or anti-bacterial coatings in such automated systems.

Epoxy coating materials are used as protective and decorative coatings for steel and aluminum substrates in maintenance, marine, architectural, aircraft, and many other product finishing markets. The basic raw materials used to prepare these coatings generally comprise as essential components (a) an epoxy resin, (b) a hardener and (c) a pigment component.

However, there is still need for an easy to use epoxy-based coatings for pathology systems.

SUMMARY

The present disclosure relates to a composition including an aqueous dispersion of epoxy resin particles having at least two 1,2-epoxide groups, and one or more functional agents including one or more anti-adhesive agents, one or more anti-microbial agents, or a combination thereof.

In some embodiments, the present disclosure relates to a composition, wherein the composition includes the one or more anti-adhesive agents, and wherein the one or more anti-adhesive agents are selected to prevent adhesion between a microtome holder assembly including a microtome and an embedding material embedding a tissue sample to be sectioned by the microtome. In some embodiments, the present disclosure relates to a composition, wherein the composition includes the one or more anti-adhesive agents, and wherein the one or more anti-adhesive agents are selected to prevent adhesions between a section transfer medium and metal surfaces. In some embodiments, the present disclosure relates to a composition, wherein the composition includes the one or more anti-adhesive agents, and wherein the one or more anti-adhesive agents include one or more of: an optional methoxy; ethoxy; or alkoxy-functional silicone emulsion, including octyl tri-ethoxy silane, in which the latent silane functionality is momentarily bound within the emulsified droplets, and further optionally including a tin catalyst; a pigment component, milled or otherwise dispersed in a low molecular weight methoxy-functional poly-siloxane intermediate; aqueously dispersed particles of PTFE micro-powder; or an epoxy-siloxane hybrid polymer, optionally having both oxirane functionality, along with methoxy or ethoxy silane functional groups. In some embodiments, the present disclosure relates to a composition, wherein the composition includes the one or more anti-microbial agents, and wherein the one or more anti-microbial agents include a silver-ion (Ag+) imbued aqueous epoxy dispersion. In some embodiments, the present disclosure relates to a composition, further including an epoxy resin hardener agent, within the aqueous dispersion. In some embodiments, the present disclosure relates to a composition, wherein the epoxy resin hardener agent includes a difunctional amine. In some embodiments, the present disclosure relates to a composition, wherein the composition includes: the epoxy resin hardener agent; and the optional methoxy, ethoxy, or alkoxy-functional silicone emulsion. In some embodiments, the present disclosure relates to a composition wherein the composition includes: the epoxy resin hardener agent; and the pigment component. In some embodiments, the present disclosure relates to a composition, wherein the composition includes: the epoxy resin hardener agent; and the aqueously dispersed particles of PTFE micro-powder. In some embodiments, the present disclosure relates to a composition, wherein the composition includes: the epoxy resin hardener agent; and the epoxy-siloxane hybrid polymer, optionally having both oxirane functionality, along with methoxy or ethoxy silane functional groups. In some embodiments, the present disclosure relates to a composition, wherein the composition includes: the epoxy resin hardener agent; and the silver-ion (Ag+) imbued aqueous epoxy dispersion. In some embodiments, the present disclosure relates to a composition, wherein the composition includes: the epoxy resin hardener agent; the methoxy, ethoxy, or alkoxy-functional silicone emulsion; and the pigment component. In some embodiments, the present disclosure relates to a composition, wherein the composition includes: the epoxy resin hardener agent; the optional methoxy, ethoxy, or alkoxy-functional silicone emulsion; and the aqueously dispersed particles of PTFE micro-powder. In some embodiments, the present disclosure relates to a composition, wherein the composition includes: the epoxy resin hardener agent; the optional methoxy, ethoxy, or alkoxy-functional silicone emulsion; and the epoxy-siloxane hybrid polymer, optionally having both oxirane functionality, along with methoxy or ethoxy silane functional groups. In some embodiments, the present disclosure relates to a composition, wherein the composition includes: the epoxy resin hardener agent; the optional methoxy, ethoxy, or alkoxy-functional silicone emulsion; and the silver-ion (Ag+) imbued aqueous epoxy dispersion. In some embodiments, the present disclosure relates to a composition, wherein the composition includes: the epoxy resin hardener agent; the optional methoxy, ethoxy, or alkoxy-functional silicone emulsion; the pigment component; and the aqueously dispersed particles of PTFE micro-powder. In some embodiments, the present disclosure relates to a composition, wherein the composition includes: the epoxy resin hardener agent; the optional methoxy, ethoxy, or alkoxy-functional silicone emulsion; the pigment component; and the silver-ion (Ag+) imbued aqueous epoxy dispersion. In some embodiments, the present disclosure relates to a composition, wherein the composition includes: the epoxy resin hardener agent; the optional methoxy, ethoxy, or alkoxy-functional silicone emulsion; the pigment component; the aqueously dispersed particles of PTFE micro-powder; and the epoxy-siloxane hybrid polymer, optionally having both oxirane functionality, along with methoxy or ethoxy silane functional groups. In some embodiments, the present disclosure relates to a composition, wherein the composition includes: the epoxy resin hardener agent; the optional methoxy, ethoxy, or alkoxy-functional silicone emulsion; the pigment component; the aqueously dispersed particles of PTFE micro-powder; and the silver-ion (Ag+) imbued aqueous epoxy dispersion. In some embodiments, the present disclosure relates to a composition, wherein the composition includes: the epoxy resin hardener agent; the optional methoxy, ethoxy, or alkoxy-functional silicone emulsion; the pigment component; the aqueously dispersed particles of PTFE micro-powder; the epoxy-siloxane hybrid polymer, optionally having both oxirane functionality, along with methoxy or ethoxy silane functional groups; and the silver-ion (Ag+) imbued aqueous epoxy dispersion. In some embodiments, the present disclosure relates to a composition, including PTFE micro-powder, in the form of an aqueous dispersion, in a range of 20%-100% by volume of an aqueous-based epoxy-amine dispersion, in order to impart anti-wax character to the coating, applied to both aluminum and stainless steel substrates, such that adhesion of thin sections of paraffin wax, generated during tissue sectioning, to the microtome holder assembly is prevented. In some embodiments, the present disclosure relates to a composition, including a pigment component milled in a (low molecular weight) methoxy-functional poly-siloxane intermediate, included at between 20% and 60% solids, on the basis of an aqueous-based epoxy-amine dispersion, thereby imparting anti-adhesive properties such that an adhesion of the section transfer medium to metal surfaces is prevented. In some embodiments, the present disclosure relates to a composition including an epoxy-siloxane hybrid polymer, embodying both oxirane functionality, along with methoxy silane functional groups, included at between 20% and 60% solids, on the basis of an aqueous-based epoxy-amine dispersion, thus enabling dual-cure mechanisms to occur at room temperature, wherein nucleophilic opening of the epoxide (oxirane) ring (by the amine) along with the hydrolysis/condensation reaction of pendant alkoxy groups forms siloxane segments, thereby providing anti-adhesive characteristics such that the composition further comprises an epoxy resin hardener agent. In some embodiments, the present disclosure relates to a composition, wherein an ethoxy-functional silicone emulsion, composed of octyl tri-ethoxy silane, is included at 60% by volume, on the basis of an aqueous-based epoxy-amine dispersion, in order to generate an anti-adhesive coating, capable of being sprayed onto metal substrates, such that an adhesion of the section transfer medium to metal surfaces is prevented.

The present disclosure relates to a crosslinked epoxy-siloxane copolymer composition, generated in-situ, wherein the copolymerization of the ring-opened secondary hydroxyls of any epoxy ingredient occurs with any of the included alkoxy silanes.

The present disclosure relates to a crosslinked epoxy-siloxane copolymer composition, wherein silane moieties undergo hydrolytic polycondensation, generated from silanol groups that derive from the intrinsic hydrolysis of the alkoxy silane groups, occurring upon evaporative drying of the aqueous-based coating composition.

The present disclosure relates to a crosslinked epoxy-siloxane copolymer composition, wherein the siloxane segments imbue the final cured coating with anti-adhesive aspects, the final cured coating forming a complex network composition, including a cured phase of an epoxy-amine polymer; a cured phase of condensed silanol groups, forming siloxane fragments; and a cured phase of ring-opened epoxy-siloxane segments.

The present disclosure relates to an epoxy-siloxane composition allowing for protective, anti-adhesive coatings for a substrate at dry film thicknesses in the range of from 25 micrometers to about 2 millimeters, said aqueous composition having a viscosity between 5,000 to about 500,000 centipoise.

The present disclosure relates to a system for histology including: a microtome holding assembly including a microtome configured to section a tissue block including a tissue sample embedded in an embedding material; a transfer system configured to transfer the one or more tissue sections from the microtome to one or more slides, wherein the transfer system passes over one or more surfaces; and a composition deposited on the microtome holding assembly to prevent adhesion of the embedding material to the microtome holding assembly or deposited on the one or more surfaces to prevent adhesion of the transfer system to the one or more surfaces.

In some embodiments, the present disclosure relates to a system, wherein the composition further provides anti-bacterial properties.

The present disclosure relates to a system for histology including: a microtome holding assembly including a microtome configured to section a tissue block including a tissue sample embedded in an embedding material; a transfer system configured to transfer the one or more tissue sections from the microtome to one or more slides, wherein the transfer system passes over one or more surfaces; and a composition deposited on the microtome holding assembly to prevent adhesion of the embedding material to the microtome holding assembly or deposited on the one or more surfaces to prevent adhesion of the transfer system to the one or more surfaces, wherein the composition comprises an aqueous dispersion of epoxy resin particles having at least two 1,2-epoxide groups, and one or more anti-adhesive agents, one or more anti-microbial agents, or a combination thereof.

BRIEF DESCRIPTION OF THE FIGURES

FIGS. 1A-C illustrate representative structures embodied in epoxy siloxane polymers. FIG. 1A illustrates epoxy resin chemical structure. FIG. 1B illustrates amino silane chemical structure. FIG. 1C illustrates silicone resin chemical structure.

FIG. 1D illustrates silicone epoxy hybrid, including polymers embodying epoxy, amine, alkoxy; and silicone resin architecture of arbitrary origin that may be used to synthesize epoxy-siloxane hybrid polymers of arbitrary constitution, but having both epoxy (oxirane) and alkoxy-Si (Si—O—R) functionality, such that dual cure mechanisms are possible, that is, epoxy ring opening mechanism; as well as hydrolysis of the alkoxy group, generating silanol groups therein, capable of further condensation chemistry, forming siloxanes.

FIG. 2 shows the epoxy amine prototypical reaction mechanism, in which the amine opens the oxirane ring of the epoxy resin, thereby generating secondary hydroxyls, also capable of additional reactions, including condensation with silanol groups, emanating from alkoxy hydrolysis.

FIG. 3 shows the reaction pathway of the hydrolysis of alkoxy siloxane group, enabling the formation of reactive silanol groups.

FIG. 4 illustrates the general reaction paradigm of silane coupling agents, in which the alkoxy groups are broadly representative of any alkoxy-based intermediate that may be used in some embodiments of the present disclosure.

FIG. 5 illustrates a general overview of hydrolysis and condensation chemistry that is used to generate siloxane structures.

FIGS. 6A-6C illustrate an exemplary automated pathology the system in which the instant composition can be used.

DETAILED DESCRIPTION

Figure 6A:
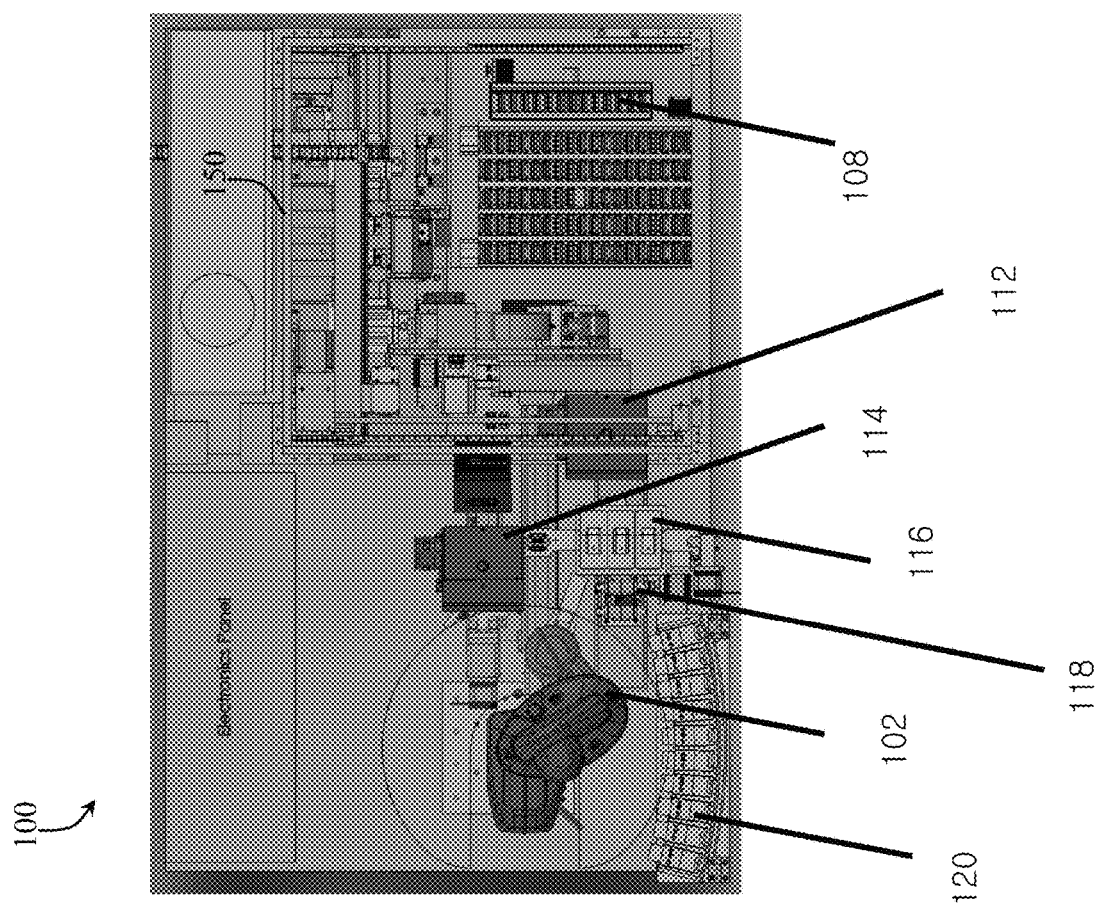

Automated tissue sectioning is a robotic process, in which tissue biopsies, embedded in a paraffin wax medium, are sectioned into extremely thin four-micron slices, and then permanently anchored onto a glass slide; these wafer-thin sections tend to accumulate on the blade holder assembly of the sectioning microtome. Because manual intervention is precluded in this robotic operation, it is imperative to remove, or else, preclude this wax debris from adhering to component metal surfaces, in order to maintain an uninterrupted workflow, thus ensuring the smooth operation of the cutting step. Furthermore, because a pressure sensitive adhesive carrier tape is used to convey the cut section from the microtome to be deposited on a glass slide, the adhesive tape tends to stick to the steel rollers, constituting certain elements of the tape handler sub-assembly of the automated tissue sectioning machine, thus posing a problem, in terms of the smooth uninterrupted functioning of the automated tape transfer process, therein.

Aspects of the disclosure relate to epoxy-polysiloxane resin (also referred herein as epoxy-polysiloxane polymer) compositions. In some embodiments, the epoxy-polysiloxane resin compositions are used as anti-adhesive protective coatings. In some embodiments, the composition has multi-functional properties, intended for an automated tissue sectioning machine. In some embodiments, the composition is coated onto a substrate and form a coating. In some embodiments, the coating has one or more of the following properties: 1. resistant to the adhesion paraffin wax. For example, the coating can be resistant to the adhesion of wafer thin cut pieces of paraffin wax, originating from sectioning embedded biological tissue; and 2. resistant to the adhesion of pressure-sensitive adhesive tapes. For example, the coating can be resistant to the adhesion of pressure-sensitive adhesive tapes constituting the roll-to-roll web of continuous carrier tape defining the tape transfer sub-assembly of an automated tissue sectioning machine.

The present disclosure provides an aqueous epoxy dispersion; in conjunction with either additional aqueous-based system ingredients, or else, partial or full solids systems that are easy to use and safe.

In particular, the present disclosure relates to an aqueous-based epoxy-polysiloxane composition manifesting multi-functional anti-adhesive properties, wherein the multi-functional coating is: 1. resistant to the adhesion of thin cut pieces of paraffin wax; 2. resistant to the adhesion of pressure-sensitive adhesive tapes constituting the continuous carrier tape defining the tape transfer sub-assembly of an automated tissue sectioning device; and 3. exhibiting anti-microbial character, said composition consisting of distinct classes of unique ingredients, comprising ingredient (a) below; and any one of the ingredients (b)-(f) below:

(a) an aqueous dispersion of an epoxy resin particle, having at least two 1,2-epoxide groups; said epoxy resin belonging to any class of epoxy structures; wherein the aqueous epoxy resin dispersion in combination with one or more ingredients below results in multi-functional properties, each said property, acting independently, or else, in combination with another property, said properties, including anti-adhesiveness to paraffin wax (debris), anti-adhesiveness to arbitrarily constructed pressure-sensitive adhesive tape; while also independently manifesting anti-microbial properties, therein.

(b) an optional methoxy; ethoxy; or alkoxy-functional silicone emulsion, composed of octyl tri-ethoxy silane, in which the latent silane functionality is momentarily bound within the emulsified droplets, also optionally containing a tin catalyst, therein.

(c) an optional pigment component milled or otherwise dispersed in a (low molecular weight) methoxy-functional poly-siloxane intermediate (d) optionally, aqueously dispersed particles of PTFE micro-powder (e) an optional epoxy-siloxane hybrid polymer, embodying both oxirane functionality, along with methoxy or ethoxy silane functional groups (f) a separate silver-ion (Ag+) imbued aqueous epoxy dispersion, manifesting anti-microbial character, therein.

In some embodiments, the composition can include the epoxy resin, as per ingredient (a) above, and component (g) below:

(g) an optional difunctional amine or other epoxy resin hardener component, within the aqueous dispersion, also containing the epoxy resin particles; or else, added separately, as an aqueous dispersion, said dispersion particles, capable of oxirane ring opening of the epoxy resin functionality, such that secondary hydroxyl groups are generated in-situ, these secondary hydroxyls having reactive potential, therein.

In some embodiments, the composition can include the epoxy resin, as per ingredient (a) above; optionally containing component (g) above; in addition, containing component (b) above. In some embodiments, the composition can include the epoxy resin, as per ingredient (a) above; optionally containing component (g) above; in addition, containing component (c) above. In some embodiments, the composition can include the epoxy resin, as per ingredient (a) above; optionally containing component (g) above; in addition, containing component (d) above. In some embodiments, the composition can include the epoxy resin, as per ingredient (a) above; optionally containing component (g) above; in addition, containing component (e) above. In some embodiments, the composition can include the epoxy resin, as per ingredient (a) above; optionally containing component (g) above; in addition, containing component (f) above.

In some embodiments, the composition can include the epoxy resin, as per ingredient (a) above; optionally containing component (g) above; in addition, containing components (b) and (c) above. In some embodiments, the composition can include the epoxy resin, as per ingredient (a) above; optionally containing component (g) above; in addition, containing components (b) and (d) above. In some embodiments, the composition can include the epoxy resin, as per ingredient (a) above; optionally containing component (g) above; in addition, containing components (b) and (e) above. In some embodiments, the composition can include the epoxy resin, as per ingredient (a) above; optionally containing component (g) above; in addition, containing components (b) and (f) above. In some embodiments, the composition can include the epoxy resin, as per ingredient (a) above; optionally containing component (g) above; in addition, containing components (b) and (c) and (d) above. In some embodiments, the composition can include the epoxy resin, as per ingredient (a) above; optionally containing component (g) above; in addition, containing components (b) and (c) and (f) above. In some embodiments, the composition can include the epoxy resin, as per ingredient (a) above; optionally containing component (g) above; in addition, containing components (b) and (c) and (d) and (e) above. In some embodiments, the composition can include the epoxy resin, as per ingredient (a) above; optionally containing component (g) above; in addition, containing components (b) and (c) and (d) and (f) above. In some embodiments, the composition can include the epoxy resin, as per ingredient (a) above; optionally containing component (g) above; in addition, containing components (b) and (c) and (d) and (e) and (f) above.

In some embodiments, the composition can include PTFE micro-powder, in the form of an aqueous dispersion, in a range of 20%-100% by volume of an aqueous-based epoxy-amine dispersion, in order to impart anti-wax character to the coating, applied to both aluminum and stainless steel substrates, such that thin sections of paraffin wax, generated during tissue sectioning, do not adhere to the blade holder, associated with the automated sectioning microtome, but instead, slide off the blade holder assembly, enabling therefore, any wax debris to be removed.

In some embodiments, the composition can include a pigment component milled in a (low molecular weight) methoxy-functional poly-siloxane intermediate, included at between 20% and 60% solids, for example, 40% solids, on the basis of an aqueous-based epoxy-amine dispersion, thereby imparting anti-adhesive properties, such that pressure-sensitive adhesive tapes of arbitrary chemistry, do not adhere to coated metal surfaces, whatsoever.

In some embodiments, the composition can include an epoxy-siloxane hybrid polymer, embodying both oxirane functionality, along with methoxy silane functional groups, included at between 20% and 60% solids, for example, 40% solids, on the basis of an aqueous-based epoxy-amine dispersion, thus enabling dual-cure mechanisms to occur at room temperature: nucleophilic opening of the epoxide (oxirane) ring (by the amine) along with the hydrolysis/condensation reaction of pendant alkoxy groups, thus forming siloxane segments, thereby providing anti-adhesive characteristics to the clear coating, such that pressure-sensitive adhesive tapes do not adhere to coated metal substrates.

In some embodiments, the composition can include an ethoxy-functional silicone emulsion, composed of octyl tri-ethoxy silane, included at 60% by volume, on the basis of an aqueous-based epoxy-amine dispersion, in order to generate an anti-adhesive coating, capable of being sprayed onto metal substrates, such as stainless steel and aluminum.

In some embodiments, the present disclosure can include a crosslinked epoxy-siloxane copolymer composition, generated in-situ, wherein the copolymerization of the ring-opened secondary hydroxyls of any epoxy ingredient occurs with any of the included alkoxy silanes.

In some embodiments, the present disclosure can include a crosslinked epoxy-siloxane copolymer composition, wherein silane moieties undergo hydrolytic polycondensation, generated from silanol groups that derive from the intrinsic hydrolysis of the alkoxy silane groups, occurring, necessarily upon evaporative drying of the aqueous-based coating composition.

In some embodiments, the present disclosure can include a crosslinked epoxy-siloxane copolymer composition, wherein the siloxane segments imbue the final cured coating with anti-adhesive aspects, the final cured coating forming a complex network composition, comprising a cured phase of an epoxy-amine polymer; a cured phase of condensed silanol groups, forming siloxane fragments; and a cured phase of ring-opened epoxy-siloxane segments.

In some embodiments, the present disclosure can include an epoxy-siloxane composition allowing for protective, anti-adhesive coatings for steel, aluminum, and other arbitrary substrates at dry film thicknesses in the range of from 25 micrometers to about two millimeters, said aqueous composition capable of application with conventional air, airless, air-assisted airless and electrostatic spray equipment, while also capable of being applied by brushing, roller coating, or any other arbitrary coating method, known to those skilled in the art Compositions and Methods of Use Aspects of the disclosure relate to epoxy-based coating compositions having a molecular weight ranging from 5,000 to about 500,000 g/mol. In some embodiments, the composition differs from the much higher MW epoxy-siloxane hybrid, which has a very high paint-like viscosity. In some embodiments, the composition can be coated onto a solid surface. For example, the composition can be spray-deposited onto a solid surface.

In some embodiments, the composition comprises siloxane. The composition can further comprise silane having a low molecular weight ranging from about 100 to about 5,000 g/mol, such as a molecular weight range of about 200 to about 800 g/mol. For example, the composition can comprise epoxy-silane or glycidyl silane. It should be appreciated that both siloxane and silane embody alkoxy-silane end groups, but there may be many more in the epoxy-siloxane, pendant to the linear siloxane chain elements of the epoxy hybrid, thereby forming a more complex structure. In some embodiments, epoxy silane or glycidyl silane may be used provided the low molecular weight requirement is met.

Aspects of the disclosure relate to epoxy-based coating compositions having antiadhesive properties. In some embodiments, the compositions are aqueous compositions. In some embodiments, the epoxy-based coating compositions have anti-adhesive and anti-microbial properties. Provided herein are epoxy-based coating compositions comprising an epoxy-functional silicon compound, in which the epoxy-functional silicon compound is an epoxy siloxane polymer. In some embodiments, the composition comprises epoxy-functional silicon compounds that comprise a plurality of terminal epoxy groups, along with pendant alkoxy silane functionalities. In some embodiments, the poly-siloxane structures include any intrinsic polymeric constituent comprising a plurality of organo-siloxane units, embodied in an ingredient, a priori, or else, generated in-situ by hydrolysis and condensation reactions, upon evaporative drying of the aqueous coating.

Epoxy-polysiloxane compositions of the disclosure are liquid composition that have a low viscosity ranging from about 5,000 to about 500,000 centipoise. In some embodiments, the compositions are aqueous liquid compositions. In some embodiments, the compositions can be spray applied onto a substrate without the addition of a solvent. In some embodiments, organic solvents may be added to improve atomization, application with electrostatic spray equipment or to improve flow and leveling and appearance when applied by brush, roller, or standard air and airless spray equipment. In some embodiments, the solvents comprise or consist of esters, ethers, alcohols, ketones, glycols or any solvent known in the art or combinations thereof.

In some embodiments, the epoxy-based coating compositions can be applied by any method known in the art. In some embodiments, the compositions described herein can be applied by spraying, rolling, dipping, or brushing. In some embodiments, the epoxy-siloxane compositions described herein are formulated for application with, but not limited to, conventional air, airless, air-assisted airless and electrostatic spray equipment, brush, or roller.

In some embodiments, the compositions described herein adhere to steel, aluminum, concrete, and other substrates, such as, but not limited to, glass, ceramics, and polymeric materials. In some embodiments, the compositions described herein have low moisture vapor transmission rates and act as barriers to water, chloride ion ingress, thus providing excellent corrosion protection under a variety of atmospheric exposure conditions, while also having excellent resistance to chemicals and solvents.

In some embodiments, the compositions are coated onto one or more surfaces of a substrate. In some embodiments, the coating is uniform. In some embodiments, the compositions form a film on the surface of the substrate.

In some embodiments, the compositions are used as protective, anti-adhesive coatings for steel, aluminum, and other substrates at dry film thicknesses in the range of from 25 micrometers to about two millimeters. In some embodiments, the dry film thicknesses is in the range of about 25 to about 100 microns. In some embodiments, the dry film thicknesses is in the range of about 25 to about 50 microns, of about 50 to about 100 microns, of about 100 to about 200 microns, of about 200 to about 300 microns, of about 300 to about 400 microns, of about 400 to about 500 microns, of about 500 to about 600 microns, of about 600 to about 700 microns, of about 700 to about 800 microns, of about 800 to about 900 microns, of about 900 microns to about 1 millimeter, of about 1 millimeter to about 1.1 millimeter, of about 1.1 millimeter to about 1.2 millimeter, of about 1.2 millimeter to about 1.3 millimeter, of about 1.3 millimeter to about 1.4 millimeter, of about 1.4 millimeter to about 1.5 millimeter, of about 1.5 millimeter to about 1.6 millimeter, of about 1.6 millimeter to about 1.7 millimeter, of about 1.7 millimeter to about 1.8 millimeter, of about 1.8 millimeter to about 1.9 millimeter, of about 1.9 millimeter to about 2 millimeter.

In some embodiments, the compositions are cured at room temperature. In some embodiments, the compositions are cured at a temperature ranging from about 250° F. to about 450° F. (for example at about 300° F.) for about 30 minutes to about 60 minutes. For example, the compositions can be cured in an oven at about 300° F. for about one hour. Upon evaporative drying, a film coalescence occurs, which can allow for epoxy and silicone chemistry via oxirane, amine, and alkoxy functionality, thereby enabling polymeric crosslinking.

In some embodiments, the surface coating is configured such that adhesive materials do not attach, even temporally, to the coating or coated surface, i.e. do not attach to the coating and/or, exhibit intrinsic release from the surface coating. In some embodiments, the instant compositions have release systems that embody siloxanes that are pre-manufactured, associated with epoxy functionality; alkoxy functionality; or encased as a bound emulsion, so the intent is different, but with all those, Si—O— atom linkages, the final properties are tantamount to having made a similarly constituted release surface. In some embodiments, black pigments may be utilized.

The basic constituents of release coating compositions which are cured or crosslinked by hydrosilylation can be (A) a polyorganosiloxane incorporating alkenyl groups, (B) a cross-linking agent embodying organohydrogensiloxane groups; and finally, (C) a metal catalyst, which thereby accelerates the hydrosilylation reaction between (A) and (B). Hydrosilylation catalysts include complexes of group VIII metals, such as: platinum, ruthenium, rhodium, palladium, osmium, and indium. In some embodiments, the catalysts can be platinum compounds. Polysiloxanes render surfaces with anti-adhesive characteristics; these anti-adhesive treatments enable release liner constructs, in which the polysiloxane coating is applied to various paper and film substrates on an industrial scale.

In some embodiments, the epoxy-based coating compositions have one or more of the following:
 (1) anti-adhesive property to paraffin wax or similar materials used for biological tissue embedding;
 (2) anti-adhesive property to pressure sensitive adhesives, including, but not limited to, acrylic, silicone, and rubber; and other sticky debris, such as tape adhesive residue, that for example emanate within the confines of an automated tissue sectioning machine.
 (3) Anti-microbial properties.

In some embodiments, the compositions have anti-adhesive property to paraffin wax or similar materials used for biological tissue embedding. In some embodiments, the compositions have anti-adhesive property to pressure sensitive adhesives. In some embodiments, the compositions have anti-adhesive property to paraffin wax or similar materials used for biological tissue embedding and anti-adhesive property to pressure sensitive adhesives. In some embodiments, the compositions have anti-adhesive property to paraffin wax or similar materials used for biological tissue embedding and anti-microbial properties. In some embodiments, the compositions have anti-adhesive property to pressure sensitive adhesives and anti-microbial properties. In some embodiments, the compositions have anti-adhesive property to paraffin wax or similar materials used for biological tissue embedding and anti-adhesive property to pressure sensitive adhesives and anti-microbial properties.

In some embodiments, the attributes of both epoxy and silicone systems are leveraged in the form of aqueous-based epoxy-polysiloxane resin compositions useful for anti-adhesive protective coatings, in which an epoxy-polysiloxane polymer composition manifests multi-functional properties, wherein the multi-functional coating is: 1. resistant to the adhesion of wafer thin cut pieces of paraffin wax, originating from the sectioning of embedded tissue; 2. resistant to even temporary adhesion of pressure-sensitive adhesive tapes constituting the roll-to-roll web of continuous carrier tape defining the tape transfer sub-assembly of an automated tissue sectioning machine; and 3. exhibits anti-microbial character, wherein a silver ion-imbued epoxy dispersion is inherently compatible with the aqueous compositions of the present disclosure.

In some embodiments, the compositions described herein have anti-microbial properties. The antimicrobial properties have broad applicability in the design of automated tissue sectioning machines, insofar as it is desirable to maintain a highly controlled environment within certain chambers of the device.

As used herein an epoxy polymer comprises an epoxide group, also known as an oxirane ring, a highly strained three-membered —C—O—C— structure that undergoes nucleophilic ring opening reactions.

As used herein, the silanes or alkoxy silanes embody an alkoxy group, Si—O—R, capable of hydrolysis, to Si—OH or a silanol, also embodying some other (organic) reactive functionality, enabling silanes to act as reactive coupling agents, connecting inorganic materials with organic materials, for example, or else, to otherwise function as crosslinking agents.

As used herein, siloxane means any type of silicone, embodying the linear structure, —O—Si—O—Si—O—. An example includes PDMS, or polydimethylsiloxane, in which two methyl groups complete the bonding to the Si atom, which requires four covalent bonds.

The term "epoxy-functional compound" as used herein is intended to encompass any compound that has at least one epoxy group, i.e. one, two or more epoxy groups, including epoxy-functional silicon compounds as well as epoxy-functional compounds of non-silicon origin, such as those conventionally utilized in aqueous-based epoxy paint compositions, as per ingredient (a) above. In some embodiments, the epoxy-functional compound comprises two or more epoxy groups.

The term "amino-functional compound" as used herein is intended to encompass any compound that has at least one amino group capable of reacting with an epoxy group to form a ring-opened product, including amino-functional silicon compound(s) as well as amino-functional compounds of non-silicon origin, such as organic and inorganic amino compounds, such as those conventionally utilized in aqueous-based epoxy paint systems or one part aqueous-based epoxy coating compositions, manufactured for solid lubricant applications (e.g. PTFE-embodied materials from PPG), in order to imbue the intended coatings with paraffin wax resistance, specifically, as part of the multi-functional anti-adhesive composition. In some embodiments, the amino group is a primary amine.

The term "epoxy-functional silicon compound" as used herein is intended to mean a silicon compound, such as a silane, siloxane, or poly-siloxane compound, having at least one epoxy group. Illustrative examples of epoxy-functional silicon compounds are epoxy-functional poly-siloxanes and epoxy-silanes. The term epoxy-functional poly-siloxane includes a polymeric constituent having one or more poly-siloxane chains and having at least one epoxy functional group, including one, two or more epoxy groups.

The number of "epoxy equivalents" in relation to the epoxy-functional compound is defined as grams of the epoxy-functional compound divided by the epoxy equivalent weight of the epoxy-functional compound, where the epoxy equivalent weight of the epoxy-functional compound is determined as: grams of the epoxy-functional compound equivalent to 1 mol of epoxy groups.

The term "about" when used before a numerical designation, e.g., temperature, time, amount, and concentration, including range, indicates approximations which may vary by (+) or (−) 10%, 5% or 1%.

The compositions of the disclosure comprise epoxy siloxane resins (also referred herein as epoxy siloxane binders). The coating compositions may also include dispersants, stabilizing agents, and any other components used in coating compositions known to those skilled in the art.

The coating compositions of the disclosure comprise one or more epoxy siloxane binders. In some embodiments, the epoxy siloxane binder comprises an epoxy-functional silicon compound component. In some embodiments, the epoxy-functional silicon compound comprises or consists of an epoxy-siloxane resin which includes at least one epoxy functional group with a poly-siloxane backbone. In some embodiments, the epoxy-functional silicon compound comprises or consists of an epoxy-siloxane resin which includes two or more epoxy groups with a poly-siloxane backbone.

In some embodiments, the coating compositions optionally comprise a curing agent (also referred herein as hardener). In some embodiments, the curing agent comprises a nucleophilic group that is capable of reacting with the epoxy functional group to form a ring opened product.

In some embodiments, the compositions comprise a mixture of two or more epoxy-functional silicon compounds. In some embodiments, the compositions comprise two or more curing agents. In some embodiments, the compositions comprise a mixture of two or more epoxy-functional silicon compounds and two or more curing agents.

Any suitable epoxy siloxane resin may be used in the epoxy-based coating compositions provided herein.

For example, epoxy-siloxane resin systems such as siloxane resin comprising cyclohexanol, 4,4'-(1-Methyl-ethylidene) bis-, polymer with (chloromethyl) oxirane (SILIKOPON® EF, Evonik) SLM 43226 (Wacker) and ES-1002T or ES-1001T (silicone modified epoxy resin, Shin-Etsu) or the like can be used.

In some embodiments, the epoxy-siloxanes are poly-siloxanes having functional epoxide groups, which comprise at least one oligomeric or polymeric poly-siloxane segment, with terminal functional epoxide groups, in which the poly-siloxane or the side chain of the poly-siloxane framework also embodies OH groups or alkoxy silane groups. Particularly suitable polymers are, for example: Silikopon® EF, Silikoftal® ED, and Tegomer® E-Si 2330 (manufacturer: Evonik), D.E.R.™ 337 and D.E.R.™ 732 (manufacturer: Dow Epoxy Systems). Also suitable are epoxy-siloxanes such as Silres HP 1000 ® from Wacker, where phenyl silanes have been oligomerized with epoxy silanes.

In some embodiments, the epoxy-functional compounds comprise epoxy-functional silicon compounds, such as epoxy functional poly-siloxanes and/or epoxy-functional silanes, and the amino-functional compounds typically include amino-functional silicon compounds, such as amino-functional poly-siloxanes and/or amino-functional silanes.

Any suitable epoxy resin comprising at least one 1,2-epoxy group that is capable of reacting with a nucleophile to form a ring-opened species may be used in the present disclosure. The epoxy containing materials may be aliphatic, cycloaliphatic, aromatic or the like. In some embodiments, the epoxy resin comprises two or more epoxide groups that are capable of reacting with a nucleophile to form ring-opened products.

Examples of suitable epoxy-containing materials include, but are not limited to, bisphenol A type epoxy resin; a bisphenol AD type epoxy resin; a bisphenol F type epoxy resin; bisphenol S type epoxy resin, bisphenol K type epoxy resin, a phenol novolac epoxy resin; a cresol novolac epoxy resin; an alycyclic epoxy resin; a heterocyclic ring-containing epoxy resin, such as tri-glycidyl isocyanate and hydantoin epoxy; aromatic or aliphatic epoxy resins such as hydrogenated bisphenol A type epoxy resin, propylene glycol-di-glycidyl ether copolymer and pentaerythritol-polyglycidyl ether copolymer, an epoxy resin obtained by the reaction of an aromatic, aliphatic or alicyclic carboxylic acid and epichlorohydrin; a spiro ring-containing epoxy resin; a glydidyl ether epoxy resin which is a reaction product of an (ortho)-allylphenol novolac compound with epichlorohydrin; and a glycidyl ether type epoxy resin which is a reaction product of a diallyl-bisphenol compound having allyl groups located at positions ortho to the hydroxyl groups of bisphenol A with epichlorohydrin.

In some embodiments, the composition comprises an aqueous dispersion of an epoxy resin particle, having at least two 1,2-epoxide groups. The epoxy resin component allows for the composition of the disclosure to adhere to the substrate, e.g. the metallic substrate. In some embodiments, the aqueous epoxy resin dispersion is combined with one or more ingredients provides a composition with various properties such as anti-adhesiveness to paraffin wax (debris), anti-adhesiveness to pressure-sensitive adhesive tape; and anti-microbial properties.

In some embodiments, the epoxy resin particles have an average size of from about 10 nm to 1000 nm in diameter. For example, the epoxy resin particles are from about 10 nm to 50 nm, from about 50 nm to 100 nm, from about 100 nm to 200 nm, from about 200 nm to 300 nm, from about 300 nm to 400 nm, from about 400 nm to 500 nm, from about 500 nm to 600 nm, from about 600 nm to 700 nm, from about 700 nm to 800 nm, from about 800 nm to 900 nm, from about 900 nm to 1000 nm.

In some embodiments, the composition comprises from about 30% to about 60% by weight epoxy resin. In some embodiments, the composition comprises from about 30% to about 35%, from about 35% to about 40%, from about 40% to about 45%, from about 45% to about 50%, from about 50% to about 55%, from about 55% to about 60% by volume epoxy resin.

In some embodiments, the epoxide groups are end-functional groups, pendant groups, or a combination thereof. In some embodiments, the epoxide groups are end-functional groups. In some, embodiments, the composition comprises an aqueous dispersion of an epoxy resin particle, having two, three, four, five, six or more 1,2-epoxide groups.

Epoxy resins useful in forming the epoxy-polysiloxane composition are non-aromatic hydrogenated epoxy resins that contain more than one 1,2-epoxide groups per molecule. In some embodiments, the non-aromatic epoxy resin comprises two 1,2-epoxide groups per molecule. The epoxy resin can be in a liquid or solid form. In some embodiments, the epoxy resin is in liquid form, has an epoxide equivalent weight in the range of from about 100 to 5,000 by volume, and has a reactivity of about two (e.g. two functional groups, two epoxide or oxirane rings, capable of undergoing ring opening by some nucleophile, such as an amine, etc)

Ethoxy-Functional Silicone Emulsion

In some embodiment, the composition comprises from about 37.5% to about 60% by volume of an alkyl or an alkoxy silane emulsion (for example, but not limited to alkyl tri-ethoxy alkyl tri-methoxy silane emulsion. In some embodiment, the composition comprises an ethoxy-functional silicone emulsion. In some embodiment, the composition comprises from about 37.5% to about 60% by weight of an ethoxy-functional silicone emulsion. In some embodiment, the composition comprises from about 37.5% to about 40%, from about 40% to 50%, or from about 50% to about 60% by volume of an ethoxy-functional silicone emulsion. In some embodiments, the ethoxy-functional silicone emulsion comprises or consists of octyl tri-ethoxy silane, in which the latent silane functionality is momentarily bound within the emulsified droplets. In some embodiments, the percent weight of the silicone emulsion is such that the composition adheres to the substrate such as a metallic substrate and does not adhere to the pressure sensitive adhesive.

In some embodiment, the ethoxy-functional silicone emulsion comprising or consisting of octyl tri-ethoxy silane, is included at about 60% by volume, on the basis of an aqueous-based epoxy-amine dispersion, in order to generate an anti-adhesive coating, capable of being applied (e.g. sprayed) onto metal substrates, such as stainless steel and aluminum.

In some embodiment, the emulsified droplets may also contain a tin catalyst.

Polytetrafluoroethylene (PTFE)

In some embodiments, the composition comprises from 0% to about 50% by volume of aqueously dispersed particles of Polytetrafluoroethylene (PTFE) micro-powder. In some embodiment, the composition comprises from about 1% to about 50% by weight of aqueously dispersed particles of PTFE micro-powder. In some embodiment, the composition comprises from about 1% to about 5%, from about 5% to about 10%, from about 10% to about 20% from about 20% to about 30%, from about 30% to about 40%, from about 40% to about 50% by weight of aqueously dispersed particles of PTFE micro-powder.

The addition of the PTFE micro-powder component to the composition allows for resistance to paraffin wax adhesion. In particular, addition of the PTFE micro-powder component to the composition allows for resistance to paraffin wax adhesion in which the adsorbed particles manifest a low coefficient of surface friction, e.g. from about 0.01-0.1 inducing, thereby, the tendency for paraffin wax sections to slide off the coated surface of apparatus that may include blades; blade holders; or other elements of a microtome device.

In some embodiments, the PTFE particles have an average size of from about 10 nm to 1000 nm in diameter. For example, the epoxy resin particles are from about 10 nm to 50 nm, from about 50 nm to 100 nm, from about 100 nm to 200 nm, from about 200 nm to 300 nm, from about 300 nm to 400 nm, from about 400 nm to 500 nm, from about 500 nm to 600 nm, from about 600 nm to 700 nm, from about 700 nm to 800 nm, from about 800 nm to 900 nm, from about 900 nm to 1000 nm.

In some embodiments, the composition incorporates PTFE micro-powder, in the form of an aqueous dispersion, in a range of 20%-100% by volume of an aqueous-based epoxy-amine dispersion, in order to impart anti-wax character to the coating, applied to both aluminum and stainless steel substrates, such that thin sections of paraffin wax, generated during tissue sectioning, do not adhere to the blade holder, associated with the automated sectioning microtome, but instead, slide off the blade holder assembly, enabling therefore, any wax debris to be removed.

Epoxy-Siloxane Hybrid Polymer

In some embodiment, the composition can optionally include from about 28.5% to about 50% epoxy-siloxane hybrid polymer, embodying both oxirane functionality, along with methoxy silane functional groups, thereby enabling dual-cure mechanisms to occur at room temperature: nucleophilic opening of the epoxide (oxirane) ring (by the amine) along with the hydrolysis/condensation reaction of pendant alkoxy groups, thus forming siloxane segments, preferentially adsorbed at the surface of the coating. In some embodiments, the composition comprises from about 28.5% to about 30%, from about 30% to about 35%, from about 35% to about 40%, from about 40% to about 45%, from about 45% to about 50% epoxy-siloxane hybrid polymer.

Silver-Ion (Ag+)

In some embodiment, the composition comprises from 0% to about 10% of a separate silver-ion (Ag+). In some embodiment, the composition comprises from about 1% to about 10% of a separate silver-ion, for example about 1%, 2%, 3%, 4%, 5%, 6%, 7%, 8%, 9%, 10% or more of a separate silver-ion and the composition has the anti-microbial property. In some embodiments, the silver-ion is in the form of an epoxy dispersion for compatibility to the base epoxy resin. In some embodiments, the silver-ion is in the form of an aqueous dispersion.

Curing Agent

The optional curing agent component may be a compound that comprises at least one nucleophilic group capable of reacting with an epoxide group to form a ring-opened product. In some embodiments, the composition comprises from 0% to about 20%, or 10% to 20% by volume of curing agent.

In some embodiments, the curing agent comprises an oxygen or sulfur nucleophile for example, but not limited to, hydroxyl and thiol groups. In some embodiments, the curing agent comprises one or more amine nucleophiles, for example, but not limited to, aliphatic amines and diamines, aromatic amines, hydrazines, hydrazides, hydroxyl-amines, alkyelendiamines, and Mannich bases. In some embodiments, the curing agent include dicarboxylic acids, carboxylic acid anhydrides, aziridines, fatty acid polyamides, dicyandiamide, acrylamides, imidazoles, hydrazidines, ethylene imines, thioureas, sulfonamides, acrylamides, guanamines, melamine, urea, polyamines, imidazoline-polyamines, or polyamine-amides or any curing agent known in the art.

In some embodiments, the curing agent comprises an amine chosen from the general classes of aliphatic amines, aliphatic amine adducts, poly-amidoamines, cycloaliphatic amines and cycloaliphatic amine adducts, aromatic amines, Mannich bases, as wells as ketimines. In some embodiments, the preferred curing agent component comprises a difunctional amine, i.e., an amine having two active hydrogens.

Addition of the curing agent to a composition comprising the epoxy siloxane resin will initiate hardening of the resin by reacting with epoxide groups in the epoxide siloxane resin, which will cause some degree of cross-linking of the resin. The curing agent can be mixed with the other components of the coating composition. In addition, a catalyst may optionally be included with the curing agent or with the epoxy siloxane resin component to aid in the curing reaction. Any suitable catalyst that increases the rate of reaction of epoxide ring opening reactions known in the art may be used.

Pigment

In some embodiments, the compositions comprise a pigment component. Pigment components can be in the form of a fine particle size material, having at least 90 weight percent greater than 325 mesh U.S. sieve size.

Suitable pigments may be organic and inorganic color pigments which include, but are not limited to, titanium dioxide, carbon black, lampblack, zinc oxide, natural and synthetic red, yellow, brown and black iron oxides, toluidine and benzidine yellow, phthalocyanine blue and green, and carbazole violet, or the like, and extender pigments including, but not limited to, ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that is used to form the composition can vary, depending on the particular composition application. In some embodiments, when a clear composition is desired, the composition does not comprise a pigment. In some embodiments, the pigment is black to minimize, or else, completely eliminate light reflections, arising from the integrated optics.

In some embodiments, the pigment component is milled in a (low molecular weight) methoxy-functional poly-siloxane intermediate. In some embodiments, the composition comprises from 0% to about 40% by weight of pigment component. In some embodiments, the composition comprises from about 1% to about 40% by weight of pigment component, for example from about 1% to about 5%, from about 5% to about 10%, from about 10% to about 20% from about 20% to about 30%, or from about 30% to about 40% by weight of pigment component.

In some embodiments, the pigment component is milled in about 500-5000 grams per mole methoxy-functional poly-siloxane intermediate.

Catalyst

In some embodiments, the compositions provided herein comprises a catalyst. Catalysts can be added to the compositions to speed drying and curing of the coating. Useful catalysts include, but are not limited to, metal driers, e.g., zinc, manganese, zirconium, titanium, cobalt, iron, lead, and tin octoates, neodecanates, and naphthanates. Suitable catalysts include but are not limited to, organotin catalysts, such as dibutyl tin dilaurate or dibutyl tin diacetate. Other catalysts include organo-titanates, sodium acetate, and aliphatic secondary or tertiary polyamines, including propylamine, ethylamino ethanol, tri-ethanolamine, tri-ethylamine, and methyl di-ethanol amine may also be used alone or in combination to accelerate hydrolytic polycondensation of the alkoxy silanes, emanating from any of the silicon-based alkoxy constituents. In some embodiments, the catalyst comprises or consists of dibutyl tin dilaurate from 0 to about 2%.

Epoxy-polysiloxane compositions of the present disclosure can comprise additional agents, such as, but not limited to, rheological modifiers, plasticizers, antifoam agents, thixotropic agents, wetting agents, extenders, anti-settling agents, diluents, UV light stabilizers, dispersing aids or any combination of the foregoing.

Epoxy-polysiloxane compositions of the present disclosure can be applied and fully cure at ambient temperature conditions. In other embodiments, compositions can be applied under bake or cure temperatures up to about 150° C. to about 200° C., in order to accelerate the curing chemistry, for example that of the epoxy-amine reaction, enhancing adhesion to metal substrates, such as steel and aluminum, mainstay materials of medical devices, in particular.

Epoxy-polysiloxane compositions of the present disclosure can be cured by: (1) the reaction of the epoxy resin with the amine curing agent to form ring-opened epoxy polymer chains; (2) the hydrolytic polycondensation of the methoxy or ethoxy silane functional groups, thereby generating siloxane polymeric chains; and (3) the copolymerization of the ring-opened secondary hydroxyls of any epoxy ingredient with any of the included alkoxy silanes. The amine moiety undergoes the epoxy-amine addition reaction, and the silane moieties undergo hydrolytic polycondensation via the generated silanol groups that derive from hydrolysis of the alkoxy silane groups (See FIG. 3).

Methods of Making

In some embodiments, an exemplary method of making the composition includes combining (a) an aqueous dispersion of an epoxy resin particle with one or more of:
(b) an ethoxy-functional silicone emulsion, comprising or consisting of octyl tri-ethoxy silane, in which the latent silane functionality is momentarily bound within the emulsified droplets. The emulsified droplets may also contain a tin catalyst.

(c) a pigment component milled in a methoxy-functional poly-siloxane intermediate, capable of reacting with other silicone, epoxy, polyester, and hydroxyl-functional resins to produce coatings with outstanding anti-adhesive properties, specifically to pressure-sensitive adhesive tapes of arbitrary chemistry, including those generated using acrylic; silicone; or rubber materials.

(d) aqueously dispersed particles of Polytetrafluoroethylene (PTFE) micro-powder (e) an optional epoxy-siloxane hybrid polymer, embodying both oxirane functionality, along with methoxy silane functional groups (f) a separate silver-ion (Ag+) imbued aqueous epoxy dispersion, manifesting anti-microbial character, therein.

(g) a difunctional amine hardener component, embodied within the aqueous dispersion itself, also containing the epoxy resin particles, but separated, in-situ, from each other, within the continuous water phase, but which react, upon evaporative drying of the water phase; or else, added separately, as an aqueous dispersion, said dispersion particles, capable of oxirane ring opening of the epoxy resin functionality, such that secondary hydroxyl groups are thereby generated, in-situ, these secondary hydroxyls having reactive potential, therein.

In some embodiments, these components react to form a complex network composition that comprises a cured phase of an epoxy-amine polymer; a cured phase of condensed silanol groups, forming siloxane fragments; and a cured phase of ring-opened epoxy-siloxane segments.

According to aspects of the disclosure, any one of the independent ingredients, (b)-(f), can be added to (a) to provide for the multi-functional properties, each said property, acting independently, or else, in combination with another property, said (multiple) properties, including anti-adhesiveness to paraffin wax (or debris), anti-adhesiveness to pressure-sensitive adhesive tape; while also independently manifesting anti-microbial properties, therein. Every additional component, b-g, is with respect to (a), and can be independently present as follows:

b to a is greater than about 60% and lesser than about 80%;

c to a is greater than about 40% and lesser than about 60%;

d to a is greater than about 50% and lesser than about 100%;

e to a is greater than about 40% and lesser than about 60%;

f to a is greater than 0% and lesser than about 10%;

g to a is greater than about 10% and lesser than about 20%.

In some embodiments, the composition comprises the epoxy resin (a) above, and an optional difunctional amine or other epoxy resin hardener component (g) within the aqueous dispersion, also containing the epoxy resin particles or added separately, as an aqueous dispersion, said dispersion particles, capable of oxirane ring opening of the epoxy resin functionality, such that reactive secondary hydroxyl groups are generated.

In some embodiments, the composition comprises the epoxy resin (a); optionally containing component (g); and component (b). In some embodiments, the composition comprises the epoxy resin (a); optionally containing component (g) and component (c). In some embodiments, the composition comprises the epoxy resin (a); optionally containing component (g) and component (d). In some embodiments, the composition comprises the epoxy resin (a); optionally containing component (g) and component (e). In some embodiments, the composition comprises the epoxy resin (a); optionally containing component (g) and component (f). In some embodiments, the composition comprises the epoxy resin (a); optionally containing component (g) and components (b) and (c). In some embodiments, the composition comprises the epoxy resin (a); optionally containing component (g) and components (b) and (d). In some embodiments, the composition comprises the epoxy resin (a); optionally containing component (g) and components (b) and (e). In some embodiments, the composition comprises the epoxy resin (a); optionally containing component (g) and components (b) and (f). In some embodiments, the composition comprises the epoxy resin (a); optionally containing component (g) and components (b) and (c) and (d). In some embodiments, the composition comprises the epoxy resin (a); optionally containing component (g) and components (b) and (c) and (f). In some embodiments, the composition comprises the epoxy resin (a); optionally containing component (g) and components (b) and (c) and (d) and (e). In some embodiments, the composition comprises the epoxy resin (a); optionally containing component (g) and components (b) and (c) and (d) and (f). In some embodiments, the composition comprises the epoxy resin (a); optionally containing component (g) and components (b) and (c) and (d) and (e) and (f).

Figure 6B:
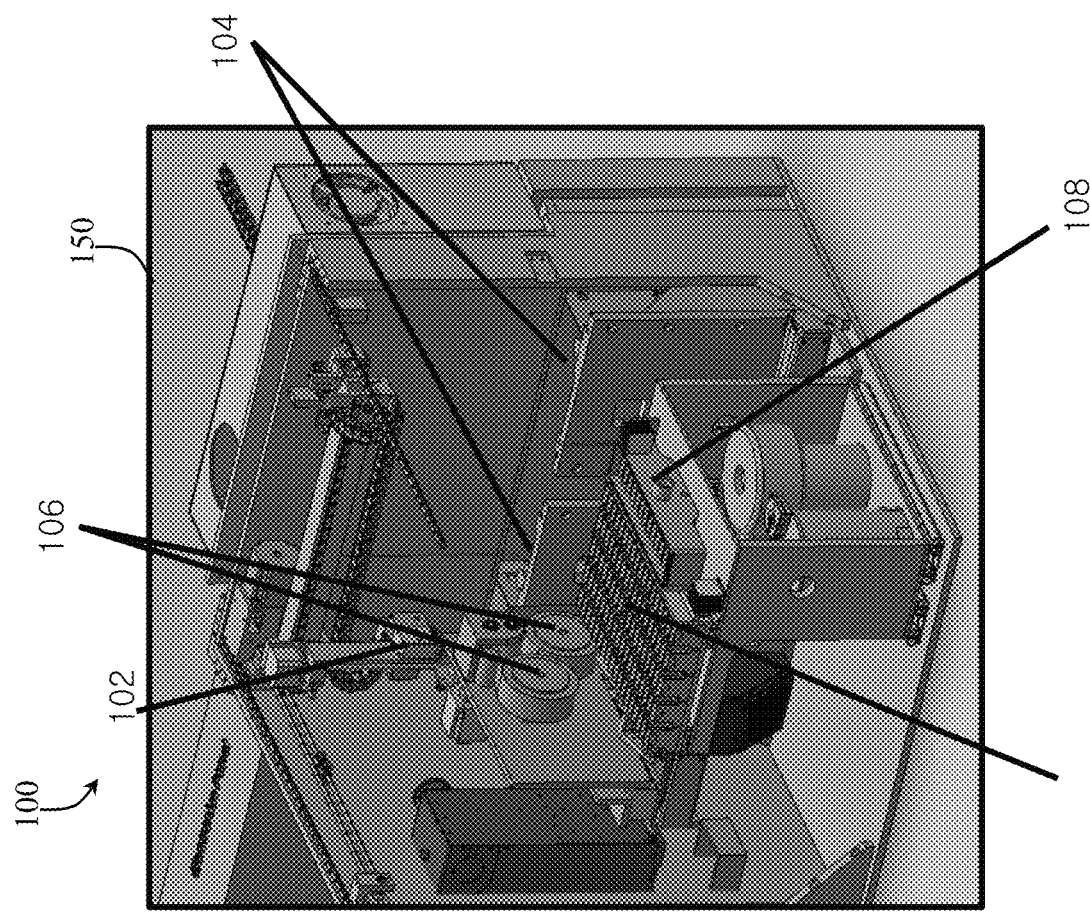

In reference FIGS. 6A-6C, the instant compositions may be used in connection with an automated pathology systems. Typically, the systems are used to prepare samples of tissue from the tissue blocks. Tissue samples are typically embedded in a preservation material, such as paraffin wax or a similar material. The embedding process can include any combination of processes for producing tissue blocks which are designed to be cut by microtomes 104. For example, biological samples can be encased within a mold along with a liquid substance, such as wax or epoxy, that can harden to produce the desired shaped block. Once tissue blocks have been created they can be inserted into an automated system 100 for cutting into samples that can be placed on slides for observation.

Referring to FIGS. 6A, 6B, and 6C, in some embodiments, an automated pathology system 100 can be designed to include a block handler 102, a microtome handling assembly including a block holder and one or more microtomes 104, a transfer medium 106 (e.g., a tape), a hydration chamber 108, and a block tray 110. The block tray 110 can be a drawer like device designed to hold a plurality of tissue blocks and can be placed into the system 100 for access by the block handler 102. The block tray 110 can have multiple rows each designed to hold one or more tissue blocks and can have sufficient spacing such that the block handler 102 can index, grab, and remove one tissue block at a time. In some embodiments, the block tray 110 can be designed to securely hold the tissue blocks by using, for example, a spring-loaded mechanism, so that the tissue block do not shift or fall out of the block tray 110 during handling. In some embodiments, the spring-loaded mechanism can further be designed such that the block handler 102 can pull the tissue blocks out without damaging or deforming them. For example, the pitch of the tissue block within the block tray 110 can enable the block handler grippers of the block handler 102 to access the paraffin blocks without interfering with adjacent blocks. The block handler 102 can include any combination of mechanisms capable of grasping and/or moving tissue blocks in and out of a microtome 104, specifically, into a chuck of the microtome 104. For example, the block handler 102 can include a gantry, a push and pull actuator, a gripper on a Selective Compliance Assembly Robot Arm (SCARA) robot.

Referring to FIG. 6A, in some embodiments, the system 100 can include a combination of mechanism to transfer a section cut from the tissue block onto the transfer medium 106 to be transferred to a slide for analysis. The combination of mechanism can include a slide adhesive coater 112, a slide printer 114, slide input racks 116, a slide singulator that picks a slide from a stack of slides 118, and slide output racks 120. This combination of mechanisms work together to prepare the sample on the slide and prepare the slide itself. In some embodiments, the transfer medium may come in contact with one or more surface, for example, metal rollers.

In some embodiments, the one or more microtomes 104 can include any combination of microtomes known in the art, specifically, for precisely sectioning tissue blocks. For example, the one or more microtomes 104 can be a rotary, cryomicrotome, ultramicrotome, vibrating, saw, laser, etc. based designs. In some embodiments, the one or more microtomes 104 can be designed to move the chuck up and down while also being able to move laterally (e.g., in a direction of the thickness of a block). The one or more microtomes 104 can include any combination of components for receiving and sectioning a tissue block. For example, the one or more microtomes 104 can include a knife-block with a blade handler for holding a changeable knife blade and a specimen holding unit with a chuck head and a chuck adapter for holding a tissue block.

The one or more microtomes 104 is configured to cut a tissue section from a tissue sample enclosed in a supporting block of preservation material such as paraffin wax. The one or more microtomes 104 can hold a blade aligned for cutting sections from one face of the tissue block—the block cutting face or a block face. For example, a rotary microtome, can linearly oscillate a chuck holding the specimen block with the cutting face in the blade-cutting plane, which combined with incremental advancement of the block cutting face into the cutting plane, the microtome 104 can successively shave thin tissue sections off the block cutting face.

In operation, the one or more microtomes 104 is used to face and/or sections tissue blocks. When the tissue block is initially delivered to the one or more microtomes 104, the tissue block can be faced. Facing is removing a layer of preservation material and exposing the large cross section of the tissue. That is, the preservation material with the tissue sample embedded in it can first be subjected to sectioning with relatively thick sections to remove the 0.1 mm-1 mm layer of paraffin wax on top of the tissue sample. When enough paraffin has been removed, and the complete outline of the tissue sample is exposed, the block is "faced", and ready for acquisition of a processable section that can be put on a glass slide, and the exposed face is referred to as a blockface. For the facing process, the one or more microtomes 104 can shave off sections of the block until an acceptable portion of the sample within the block is revealed. In some embodiments, the system can include on or more facing cameras to identify when an acceptable portion of the sample within the block is revealed. For the cutting process, the one or more microtomes 104 can shave off a sample section of the block with an acceptable thickness to be placed on a slide for analysis.

Once the block is faced, in some embodiments, the faced tissue blocks can be hydrated (for example, in a hydration chamber 108 or directly at the one or more microtomes 104) for a period of time in a hydrating fluid. In addition to being hydrated, the tissue blocks can be cooled. The cooling system can be part of the hydration chamber 108 or a separate component from the hydration chamber 108. In some embodiments, the cooling system can provide cooling to all the components within the sectioning chamber 150. The sectioning chamber 150 can provide insulation enclosing the one or more microtomes 104, the hydration chamber 108, the block tray 110, the blade holder and the blade exchanger of the microtome 104, and the cameras. This way there are minimal number of openings in the insulation, which can increase the efficiency and effectiveness within the sectioning chamber 150. Regardless of location, the cooling system can have a mini compressor, a heat exchanger, and an evaporator plate to create a cool surface. The air in the sectioning chamber can be pulled in and passed over the evaporator plate, for example, using fans. The cooled air can circulate in the sectioning chamber 150 and/or hydration chamber 108 to cool the paraffin tissue blocks. The mass of equipment in the cooling chamber provide a thermal inertia as well. Once the chamber is cooled, its temperature can be maintained more effectively, for example, if an access door is opened by the user to remove the block tray 110. In some embodiments, the temperature of the tissue block is maintained between 4° C. to 20° C. Keeping the tissue blocks cool can benefit the sectioning process as well as the hydration process.

Once the tissue block has been sufficiently hydrated, in some embodiments, it is ready for sectioning. Essentially, the one or more microtomes cuts thin sections of the tissue samples from the tissue block. The tissue sections can then be picked up by the transfer medium 106, such as a tape, for subsequent transfer for placement on the slides. In some embodiments, depending on the microtome 104 setup of the system 100, the system 100 can include a single or multiple transfer medium 106 units. For example, in tandem operation, the transfer medium 106 can be associated with a polishing and sectioning microtome 104, whereas in a parallel operation, a separate transfer medium 106 can be associated with each microtome 104 within the system 100. In automated systems, each of these processes/steps of facing, hydration, sectioning, and transfer to slides are computer controlled rather than performed in the manual workflow by the histotechnician.

Referring back to FIGS. 6A, 6B, and 6C, in some embodiment, the transfer medium 106 can be designed in a manner in which a tissue section cut from the tissue sample in the tissue block adheres and can then be transported by the moving transfer medium 106. For example, the transfer medium 106 can include any combination of materials designed to physically (e.g., electrostatic) and/or chemically adhere to the sample material. The transfer medium 106 can be designed to accommodate a large number of tissue sample sections cut from the block to be transferred to slides to be included on slides for evaluation. As shown in FIG. 6C, the transfer medium comes in contact with multiple surfaces.

In some embodiments, the present compositions may be applied onto a microtome holding assembly to prevent adhesion of the embedding material (paraffin) to the microtome holding assembly (for example, the one or more microtomes). In some embodiments, the instant compositions may be applied to one or more surfaces that come in contact with the transfer medium to ensure a smooth movement of the transfer medium in the system. In some embodiments, the instant compositions may include anti-bacterial agents to ensure that the tissue samples are not cross-contaminated.

Examples, which are set forth to aid in the understanding of the disclosure, should not be construed to limit in any way the scope of the disclosure as defined in the claims which follow thereafter. The following examples are put forth so as to provide those of ordinary skill in the art with a complete disclosure and description of how to make and use the embodiments of the present disclosure, and are not intended to limit the scope of the instant disclosure nor are they intended to represent that the experiments below are all or the only experiments performed. Efforts have been made to ensure accuracy with respect to numbers used (e.g. amounts, temperature, etc.), but some experimental errors and deviations should be accounted for.

EXAMPLES

The aqueous-based compositions of Examples 1~4 were prepared using PPG Xylan 1424 (an aqueous dispersion, containing epoxy; amine, wherein the amine is less than 20% by weight; and PTFE, wherein the PTFE is less than 14% by weight, with respect to the epoxy base resin, the entire mixture, comprising more than 50% water (the actual percent water accounting for 100% total weight and about 25% epoxy) as the primary base resin.

The compositions of Examples 1~4 comprise PPG Xylan 1424 aqueous dispersion of epoxy particles, an amine hardener component (which is already embodied in 1424), PTFE micro-powder particles at 14% by weight of the total solids content. A separate silver-ion (Ag+) imbued aqueous epoxy dispersion (Burke Industrial Coatings), having anti-microbial properties, was optionally added to PPG Xylan 1424 at 10% by volume.

The compositions of Examples 1~4 were used at room temperature.

Example 1: Composition Including PTFE Micropowder

Additional PTFE micro-powder or particulate form of PTFE, in the form of an aqueous dispersion, sourced from Micropowders, Inc. was added to the PPG Xylan 1424 base resin at about 50% by weight, in order to impart anti-wax character to the coating.

The composition was applied to aluminum foil using a Binks spray gun at a thickness of about 1-mil-2-mil. Scrapings generated from a block of pure paraffin wax was deposited onto the aluminum foil. The composition exhibited anti-adhesion to paraffin wax, tested on aluminum foil, representative of a metal substrate.

The composition was brushed (1-mil-2-mil thickness) onto stainless steel blade holder within the V4 prototype machine, in which paraffin wax sections rolled off the coated metal substrate. The thin sections of paraffin wax, generated during tissue sectioning, did not adhere to the blade holder, associated with the microtome, but instead, slide off the assembly, enabling removal of any wax debris.

Example 2: Black Pigmented Coating

A pigment component milled in a (low molecular weight) methoxy-functional poly-siloxane intermediate, namely Chroma-Chem UCD-1625PS black, sourced from Chromaflo, was added at 40% solids, in order to impart a black pigmented coating.

The composition was brushed onto aluminum foil. The composition exhibited anti-adhesion to silicone-based PSA tape. The aqueous mixture was transferred to a cup and sprayed from a few feet away to produce a film thickness ~1-mil-2-mil.

The Composition was Sprayed onto Aluminum Foil Using a Commercial Spray Gun (Binks Spray Gun with an Air Compressor). The Composition was Sprayed from a Few Feet Away. The resulting film thickness was from about 1 to about 2 mm. The composition exhibited anti-adhesion to silicone-based PSA tape. Film thickness ~1-mil-2-mil].

Example 3

An epoxy-siloxane hybrid polymer (Silikopon EF, Evonik), embodying both oxirane functionality, along with methoxy silane functional groups, was added to PPG Xylan 1424 at 40% solids, thus enabling dual-cure mechanisms to occur at room temperature: nucleophilic opening of the epoxide (oxirane) ring (by the amine) along with the hydrolysis/condensation reaction of pendant alkoxy groups, thus forming siloxane segments, preferentially adsorbed at the surface of the coating.

The composition was brushed or sprayed as described in Example 2 to onto aluminum foil.

The composition provided anti-adhesive characteristics to the clear coating, such that pressure-sensitive adhesive tapes did not adhere to coated aluminum foil.

Example 4

An ethoxy-functional silicone emulsion (SilTech 2152), composed of octyl tri-ethoxy silane, in which the latent silane functionality is momentarily bound within the emulsified droplets, was added to PPG Xylan 1424 at 60% by volume.
1) The composition was sprayed using a Binks spray gun onto aluminum foil as described in Example 2. The composition exhibited anti-adhesion to silicone-based pressure-sensitive adhesive tapes.
2) The composition was brushed using a paint brush onto steel roller of the tape handler, used in the V4 prototype. The composition exhibited anti-adhesion to silicone-based pressure-sensitive adhesive tapes.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the disclosure. It is intended that the present disclosure be limited only to the extent required by the appended claims and the applicable rules of law.

It is also to be understood that the following claims are to cover all generic and specific features of the disclosure described herein, and all statements of the scope of the disclosure which, as a matter of language, might be said to fall therebetween.

What is claimed is:

1. A composition, comprising an aqueous dispersion of epoxy resin particles having at least two 1,2-epoxide groups, and one or more anti-adhesive agents, wherein:
   the one or more anti-adhesive agents comprises an ethoxy-functional silicone emulsion, composed of octyl tri-ethoxy silane, included at 60% by volume, on the basis of the aqueous dispersion of epoxy resin particles, in order to generate an anti-adhesive coating, capable of being sprayed onto metal substrates, such that an adhesion of a section transfer medium to metal surfaces is prevented.

2. The composition of claim 1, wherein the one or more anti-adhesive agents are selected to prevent adhesion between a microtome holder assembly comprising a microtome and an embedding material embedding a tissue sample to be sectioned by the microtome.

3. The composition of claim 1, wherein the one or more anti-adhesive agents are selected to prevent adhesions between a section transfer medium and metal surfaces.

4. The composition of claim 1, wherein the one or more anti-adhesive agents further comprise one or more of:
   a tin catalyst;
   a pigment component, milled or otherwise dispersed in a low molecular weight methoxy-functional poly-siloxane intermediate;
   aqueously dispersed particles of PTFE micro-powder; or
   an epoxy-siloxane hybrid polymer, having both oxirane functionality, along with methoxy or ethoxy silane functional groups.

5. The composition of claim 1, wherein the composition further comprises one or more anti-microbial agents, and wherein the one or more anti-microbial agents comprise a silver-ion (Ag+) imbued aqueous epoxy dispersion.

6. The composition of claim 1, further comprising an epoxy resin hardener agent, within the aqueous dispersion of epoxy resin particles.

7. The composition of claim 6, wherein the epoxy resin hardener agent comprises a difunctional amine.

8. The composition of claim 6, wherein the composition further comprises a pigment component, milled or otherwise dispersed in a low molecular weight methoxy-functional poly-siloxane intermediate.

9. The composition of claim 6, wherein the composition further comprises dispersed particles of PTFE micro-powder.

10. The composition of claim 6, wherein the composition further comprises an epoxy-siloxane hybrid polymer, having both oxirane functionality, along with methoxy or ethoxy silane functional groups.

11. The composition of claim 6, wherein the composition further comprises one or more anti-microbial agents, wherein the one or more anti-microbial agents comprise a silver-ion (Ag+) imbued aqueous epoxy dispersion.

12. The composition of claim 6, wherein the composition further comprises: a pigment component, milled or otherwise dispersed in a low molecular weight methoxy-functional poly-siloxane intermediate; and aqueously dispersed particles of PTFE micro-powder.

13. The composition of claim 6, wherein the composition further comprises: a pigment component, milled or otherwise dispersed in a low molecular weight methoxy-functional poly-siloxane intermediate; and one or more anti-microbial agents, wherein the one or more anti-microbial agents comprise a silver-ion (Ag+) imbued aqueous epoxy dispersion.

14. The composition of claim 6, wherein the composition further comprises: a pigment component, milled or otherwise dispersed in a low molecular weight methoxy-functional poly-siloxane intermediate; aqueously dispersed particles of PTFE micro-powder; and an epoxy-siloxane hybrid polymer, having both oxirane functionality, along with methoxy or ethoxy silane functional groups.

15. The composition of claim 6, wherein the composition further comprises: a pigment component, milled or otherwise dispersed in a low molecular weight methoxy-functional poly-siloxane intermediate; aqueously dispersed particles of PTFE micro-powder; and one or more anti-microbial agents, wherein the one or more anti-microbial agents comprise a silver-ion (Ag+) imbued aqueous epoxy dispersion.

16. The composition of claim 6, wherein the composition further comprises: a pigment component, milled or otherwise dispersed in a low molecular weight methoxy-functional poly-siloxane intermediate; aqueously dispersed particles of PTFE micro-powder; an epoxy-siloxane hybrid polymer, having both oxirane functionality, along with methoxy or ethoxy silane functional groups; and one or more anti-microbial agents, wherein the one or more anti-microbial agents comprise a silver-ion (Ag+) imbued aqueous epoxy dispersion.

17. The composition of claim 2, further comprising aqueously dispersed PTFE micro-powder in a range of 20%-100% by volume of the aqueous dispersion, in order to impart anti-wax character to the anti-adhesive coating, applied to both aluminum and stainless steel substrates, such that adhesion of thin sections of paraffin wax, generated during tissue sectioning, to the microtome holder assembly is prevented, wherein the aqueous dispersion of resin particles comprises an aqueous-based epoxy-amine dispersion.

18. The composition of claim 3, further comprising a pigment component milled in a low molecular weight methoxy-functional poly-siloxane intermediate, included at between 20% and 60% solids, on the basis of the aqueous dispersion, thereby imparting anti-adhesive properties such that an adhesion of the section transfer medium to metal surfaces is prevented, wherein the aqueous dispersion of epoxy resin particles comprises an aqueous-based epoxy-amine dispersion.

19. The composition of claim 1, further comprising an epoxy-siloxane hybrid polymer, embodying both oxirane functionality, along with methoxy silane functional groups, included at between 20% and 60% solids, on the basis of the aqueous-dispersion, wherein the aqueous dispersion of epoxy resin particles comprises an aqueous-based epoxy-amine dispersion, thus enabling dual-cure mechanisms to occur at room temperature, wherein nucleophilic opening of an oxirane ring by an amine along with a hydrolysis/condensation reaction of pendant alkoxy groups forms siloxane segments, thereby providing anti-adhesive characteristics such that the composition further comprises an epoxy resin hardener agent.

20. The composition of claim 1, wherein the aqueous dispersion of epoxy resin particles comprises an aqueous-based epoxy-amine dispersion.

21. The composition of claim 1, further comprising one or more anti-microbial agents.

22. A system for histology, comprising:
   a microtome holding assembly comprising a microtome configured to section a tissue block comprising a tissue sample embedded in an embedding material;
   a transfer system configured to transfer one or more tissue sections from the microtome to one or more slides, wherein the transfer system passes over one or more surfaces; and
   a composition deposited on the microtome holding assembly to prevent adhesion of the embedding material to the microtome holding assembly or deposited on the one or more surfaces to prevent adhesion of the transfer system to the one or more surfaces, wherein the composition comprises an aqueous dispersion of epoxy resin particles having at least two 1,2-epoxide groups, and one or more anti-adhesive agents.

23. The system of claim 22, wherein the composition further comprises one or more anti-microbial agents.

24. The system of claim 22, wherein:
the aqueous dispersion of epoxy resin particles comprises an aqueous-based epoxy-amine dispersion; and
the one or more anti-adhesive agents comprises an ethoxy-functional silicone emulsion, composed of octyl tri-ethoxy silane, included at 60% by volume, on the basis of the aqueous-based epoxy-amine dispersion, in order to generate an anti-adhesive coating, capable of being sprayed onto metal substrates, such that an adhesion of the transfer system to the one or more surfaces is prevented.

25. The system of claim 22, wherein:
the aqueous dispersion of epoxy resin particles comprises an aqueous-based epoxy-amine dispersion; and
the composition comprises PTFE micro-powder, in a form of an aqueous dispersion, in a range of 20%-100% by volume of the aqueous-based epoxy-amine dispersion, in order to impart anti-wax character to a coating, applied to both aluminum and stainless steel substrates, such that adhesion of thin sections of paraffin wax, generated during tissue sectioning, to the microtome holding assembly is prevented.

26. The system of claim 22, wherein the one or more anti-adhesive agents are further selected to prevent adhesions between a transfer medium of the transfer system and metal surfaces.

27. The system of claim 26, wherein:
the aqueous dispersion of epoxy resin particles comprises an aqueous-based epoxy-amine dispersion; and
the composition further comprises a pigment component milled in a low molecular weight methoxy-functional poly-siloxane intermediate, included at between 20% and 60% solids, on the basis of an aqueous-based epoxy-amine dispersion, thereby imparting anti-adhesive properties such that an adhesion of the transfer medium to metal surfaces is prevented.

28. The system of claim 22, wherein the one or more anti-adhesive agents comprise one or more of:
a methoxy, ethoxy, or alkoxy-functional silicone emulsion, comprising octyl tri-ethoxy silane, in which a latent silane functionality is momentarily bound within emulsified droplets, and further comprising a tin catalyst;
a pigment component, milled or otherwise dispersed in a low molecular weight methoxy-functional poly-siloxane intermediate;
aqueously dispersed particles of PTFE micro-powder; or
an epoxy-siloxane hybrid polymer, having both oxirane functionality, along with methoxy or ethoxy silane functional groups.

29. The system of claim 22, wherein the composition further comprises one or more anti-microbial agents, and wherein the one or more anti-microbial agents comprise a silver-ion (Ag+) imbued aqueous epoxy dispersion.

30. The system of claim 22, wherein the composition further comprises an epoxy resin hardener agent, within the aqueous dispersion of epoxy resin particles.

31. The system of claim 22, wherein:
the aqueous dispersion of epoxy resin particles comprises an aqueous-based epoxy-amine dispersion; and
the composition further comprises an epoxy-siloxane hybrid polymer, embodying both oxirane functionality, along with methoxy silane functional groups, included at between 20% and 60% solids, on the basis of an aqueous-based epoxy-amine dispersion, thus enabling dual-cure mechanisms to occur at room temperature, wherein nucleophilic opening of an oxirane ring by an amine along with a hydrolysis/condensation reaction of pendant alkoxy groups forms siloxane segments, thereby providing anti-adhesive characteristics such that the composition further comprises an epoxy resin hardener agent.

* * * * *